US011523342B2

(12) United States Patent
Yukawa

(10) Patent No.: US 11,523,342 B2
(45) Date of Patent: Dec. 6, 2022

(54) COMMUNICATION APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Mitsuyoshi Yukawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/231,037

(22) Filed: Apr. 15, 2021

(65) Prior Publication Data

US 2021/0235383 A1 Jul. 29, 2021

Related U.S. Application Data

(63) Continuation of application No. PCT/JP2019/043634, filed on Nov. 7, 2019.

(30) Foreign Application Priority Data

Dec. 27, 2018 (JP) .............................. JP2018-245382

(51) Int. Cl.
*H04W 52/02* (2009.01)

(52) U.S. Cl.
CPC ... *H04W 52/0232* (2013.01); *H04W 52/0241* (2013.01); *H04W 52/0245* (2013.01)

(58) Field of Classification Search
CPC ............. H04W 52/02; H04W 52/0225; H04W 52/0232; H04W 52/0241; H04W 52/0245;
(Continued)

(56) References Cited

U.S. PATENT DOCUMENTS 11,317,348 B2 * 4/2022 Chitrakar ............ H04W 12/121
2017/0094600 A1 3/2017 Min et al.
(Continued)

FOREIGN PATENT DOCUMENTS

EP 3349515 A1 * 7/2018 ........ H04W 52/0216
JP 2018-113646 A 7/2018
(Continued)

OTHER PUBLICATIONS

International Search Report issued by the Japan Patent Office dated Dec. 10, 2019 in corresponding International Application No. PCT/JP2019/043634, with English translation.

*Primary Examiner* — Kevin D Mew
(74) *Attorney, Agent, or Firm* — Carter, DeLuca & Farrell LLP

(57) ABSTRACT

A communication apparatus comprises a first communication unit configured to connect to another communication apparatus and communicate by using a PCR (Primary Connectivity Radio) function, and a second communication unit configured to communicate with the other communication apparatus by using a WUR (Wake Up Radio) function. The communication apparatus stores, in a storage unit, a first transmission rate which is a transmission rate of the first communication unit used before the WUR mode is started, and sets the stored first transmission rate as a second transmission rate which is a transmission rate of the first communication unit used when the WUR mode has been ended.

13 Claims, 5 Drawing Sheets

(58) Field of Classification Search
CPC ......... H04W 52/0258; H04W 52/0261; H04W 52/0274; H04W 52/0277; H04W 52/028
See application file for complete search history.

(56) References Cited

U.S. PATENT DOCUMENTS

| | | |
|---|---|---|
| 2018/0234918 A1 | 8/2018 | Asterjadhi et al. |
| 2019/0045451 A1* | 2/2019 | Huang .................. H04L 5/0053 |
| 2019/0082390 A1* | 3/2019 | Azizi .................... H04L 5/0053 |
| 2020/0296669 A1* | 9/2020 | Azizi ................ H04W 52/0229 |
| 2021/0185612 A1* | 6/2021 | Song .................... H04W 48/10 |
| 2021/0258877 A1* | 8/2021 | Chitrakar .......... H04W 52/0216 |
| 2022/0132421 A1* | 4/2022 | Wang .................... H04W 48/16 |

FOREIGN PATENT DOCUMENTS

| | | | |
|---|---|---|---|
| WO | 2016/189933 A | 12/2016 | |
| WO | 2018/172347 A1 | 9/2018 | |
| WO | WO-2018204908 A1 * | 11/2018 | ............ H04W 28/16 |
| WO | WO-2018237180 A1 * | 12/2018 | ......... H04L 63/0846 |
| WO | WO-2019131548 A1 * | 7/2019 | ............ H04W 48/16 |
| WO | WO-2019169387 A1 * | 9/2019 | ........ H04W 52/0235 |

* cited by examiner

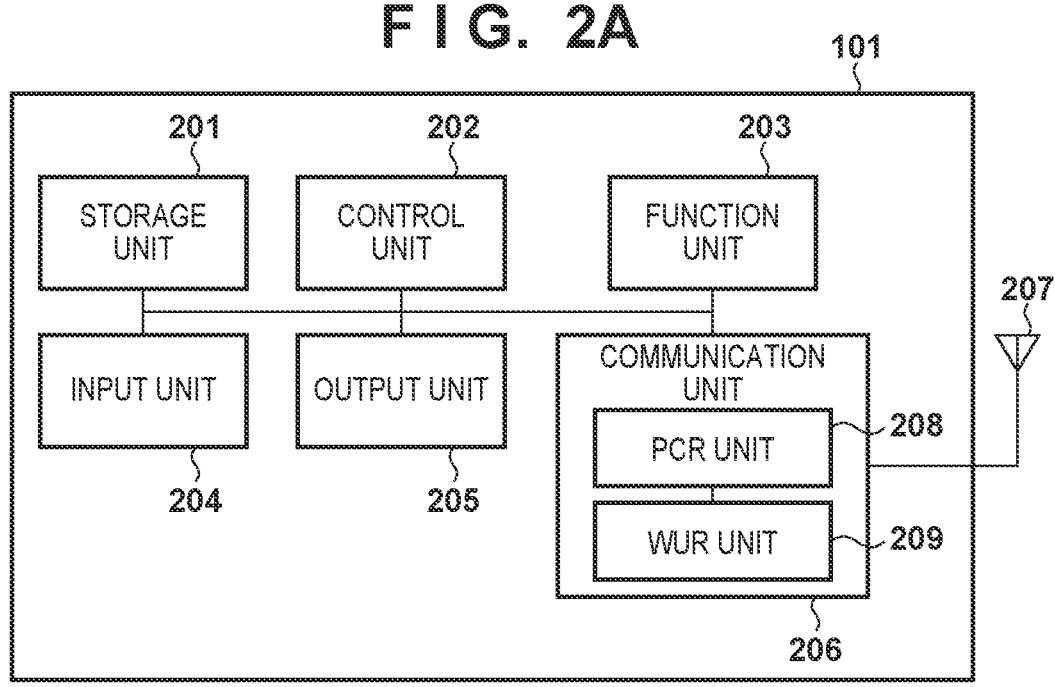
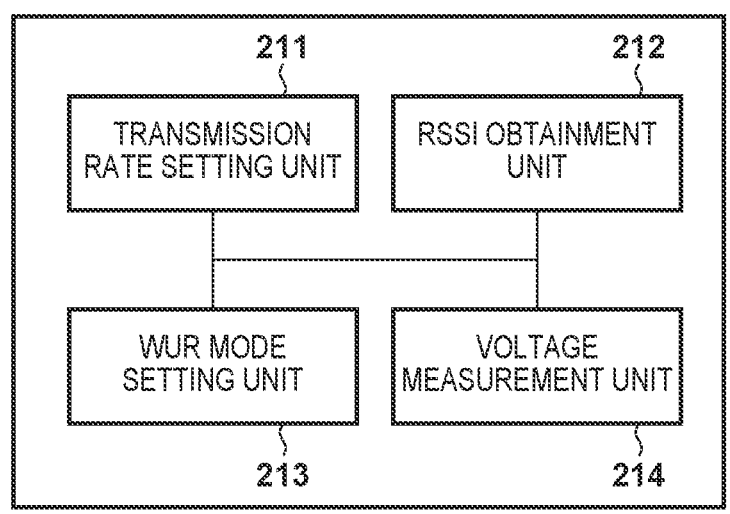

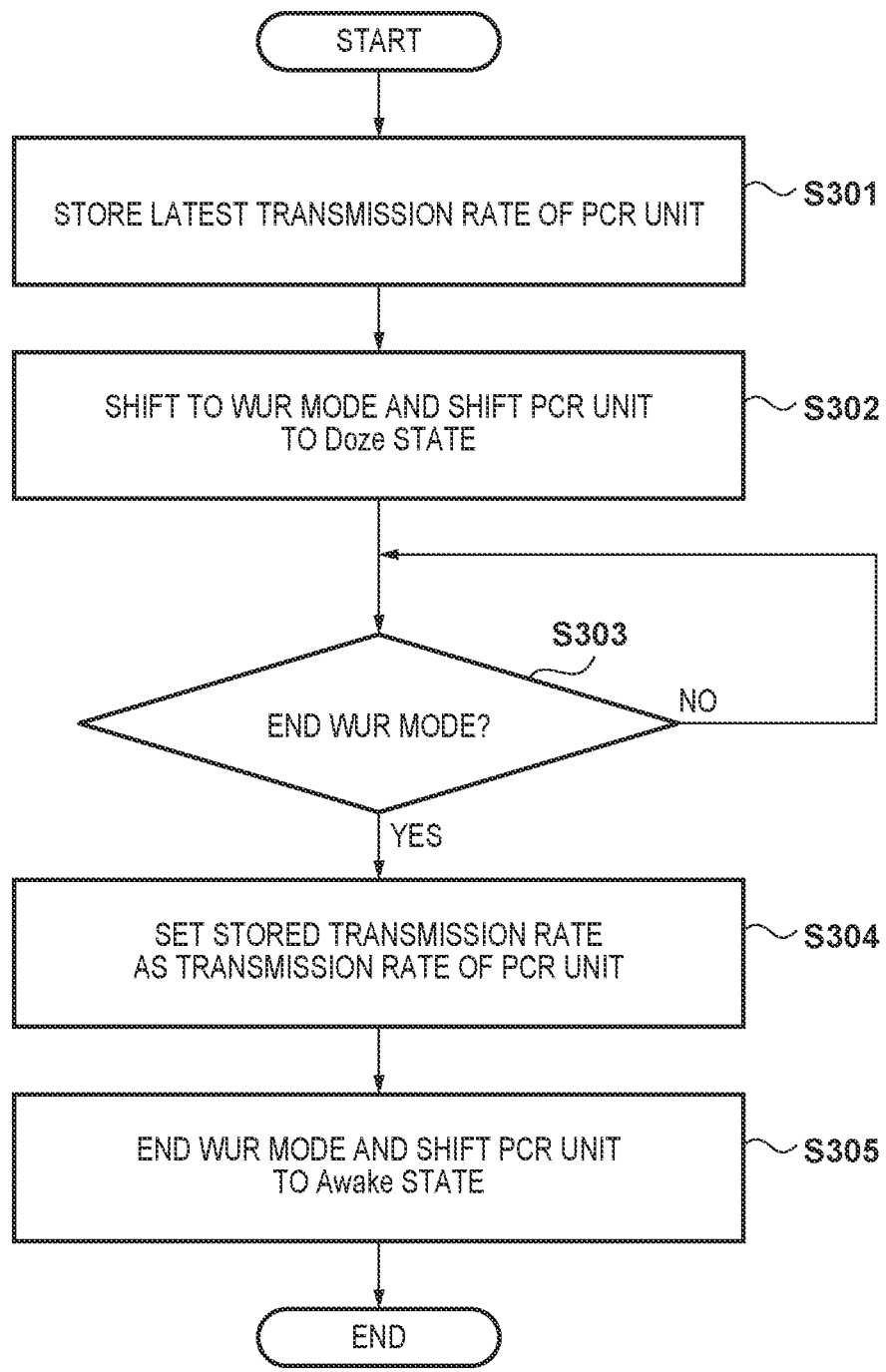

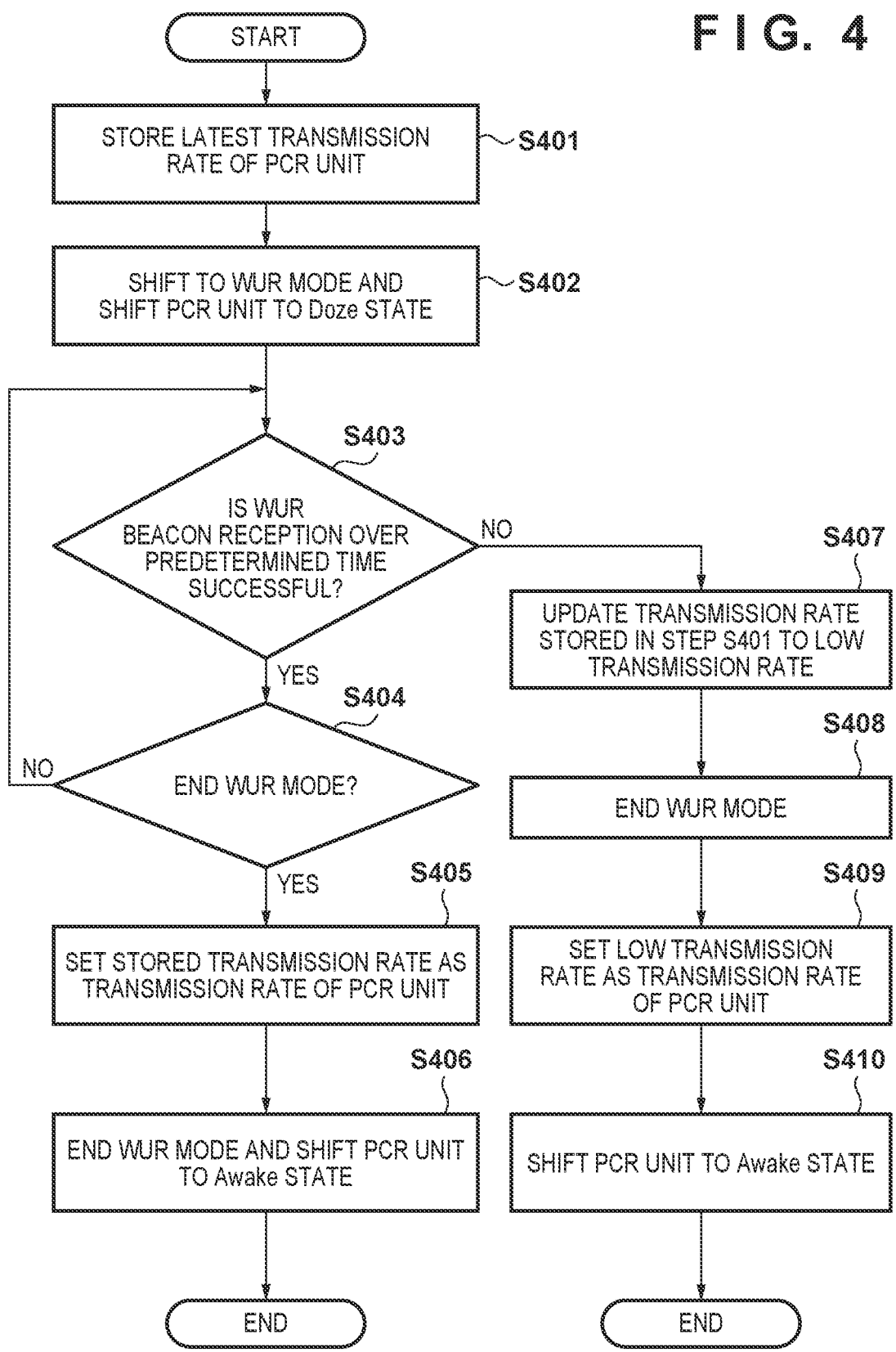

COMMUNICATION APPARATUS, METHOD OF CONTROLLING THE SAME, AND NON-TRANSITORY COMPUTER-READABLE STORAGE MEDIUM

CROSS-REFERENCE TO RELATED APPLICATIONS

This application is a Continuation of International Patent Application No. PCT/JP2019/043634, filed Nov. 7, 2019, which claims the benefit of Japanese Patent Application No. 2018-245382, filed Dec. 27, 2018, both of which are hereby incorporated by reference herein in their entirety.

BACKGROUND OF THE INVENTION

Field of the Invention

The present invention relates to a wireless communication technique.

Background Art

IEEE802.11ba which is currently being standardized proposes an arrangement in which a communication apparatus includes, in addition to a conventional wireless LAN transceiver (a transceiver that has a PCR function), a WUR transmitter or receiver (a transmitter or receiver that has a WUR function) that can operate with greater power savings (PTL 1). Note that PCR is the abbreviation of Primary Connectivity Radio, and WUR is the abbreviation of Wake Up Radio. In the following description, a transceiver which has a PCR function and a transmitter or receiver which has a WUR function will also be referred to as a PCR unit and a WUR unit, respectively.

Additionally, a WUR mode has been defined in IEEE802.11ba, and an AP (Access Point) periodically transmits a WUR beacon in this mode. An STA (Station) that has received the WUR beacon transmitted from the AP can maintain synchronization with the AP without having to communicate by using a PCR unit. If data to be transmitted from the STA to the AP is generated during the WUR mode, the STA can end the WUR mode and transmit the data from the PCR unit to the AP. Also, if data to be transmitted from the AP to the STA is generated during the WUR mode, the AP transmits a WUR Wake-up frame to the STA. In response, the STA uses a WUR unit to receive the WUR Wake-up frame, end the WUR mode, and is able to use the PCR unit to receive the data from the AP

CITATION LIST

Patent Literature

PTL 1 US-2018-0234918

In general, in wireless LAN communication, a communication apparatus will set, immediately after connecting to a partner communication apparatus, a low transmission rate to be used as the transmission rate of a wireless signal that is used for data frame transmission. Subsequently, the communication apparatus will gradually increase the transmission rate while confirming that a reception response (Ack: Acknowledgement) is being returned from the partner communication apparatus. When an Ack is not received, the communication apparatus will reduce the transmission rate and retransmit the wireless signal.

On the other hand, since the PCR unit is disabled in the communication apparatus during the WUR mode, the suitability of the setting or the transmission rate of the signal to be used in the transmission by PCR immediately after the end of the WUR mode is unknown. In order to select an appropriate transmission rate, a method in which the transmission rate is gradually increased from a low transmission rate, as described above, can be considered. However, executing this process each time the PCR unit is activated after the end of the WUR mode is neither efficient nor desirable from the point of view of power consumption and the point of view of process speed.

In consideration of the above problem, the present invention provides a technique for appropriately determining a setting related to data transmission to be performed after the end of the WUR mode.

SUMMARY OF THE INVENTION

According to one aspect of the present invention, there is provided a communication apparatus, which comprises: a first communication unit configured to connect to another communication apparatus and communicating by using a PCR (Primary Connectivity Radio) function in compliance with the IEEE802.1ba standard; a second communication unit configured to communicate with the other communication apparatus by using a WUR (Wake Up Radio) function in compliance with the IEEE802.11ba standard; a mode control unit configured to control whether to start a WUR mode in which the first communication unit is caused to shift to a power saving state or to end the WUR mode and cause the first communication unit to shift to a communicable state; a storage unit configured to store, in a storage unit, a first transmission rate which is a transmission rate of the first communication unit used before the WUR mode is started by the mode control unit; and a setting unit configured to set the first transmission rate, stored by the storage unit, as a second transmission rate which is a transmission rate of the first communication unit used when the mode control unit has ended the WUR mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2A is a block diagram showing an example of the hardware arrangement of an STA.

FIG. 2B is a block diagram showing an example of the functional arrangement of the STA:

FIG. 3 is a flowchart showing the processing of an STA according to the first embodiment;

FIG. 4 is a flowchart showing the processing of an STA according to the second embodiment;

DESCRIPTION OF THE EMBODIMENTS

Figure 1:
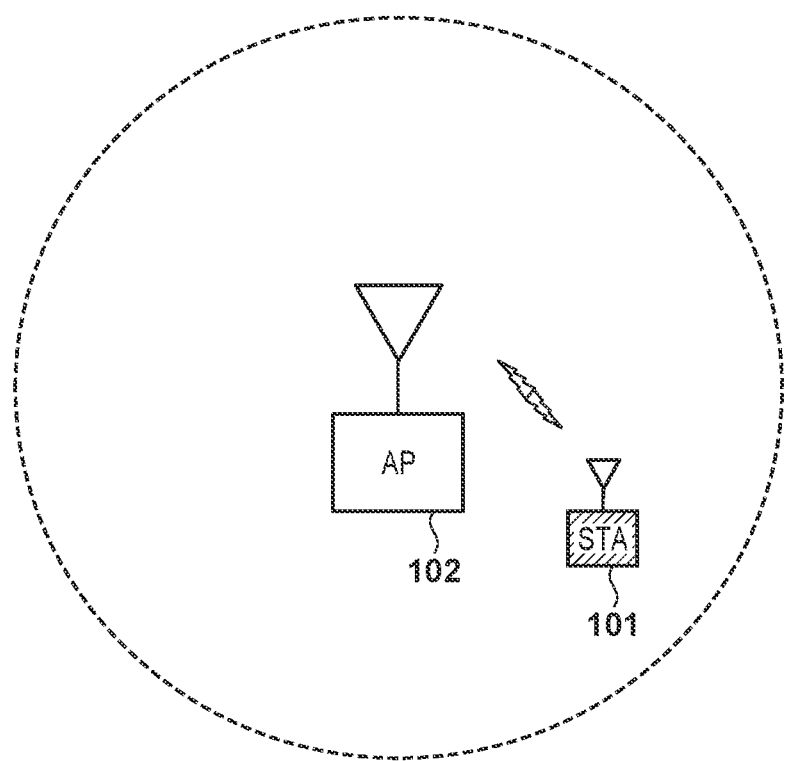
FIG. 1 is a view showing an example of the arrangement of a wireless network according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment (Network Arrangement)

FIG. 1 shows an example of the arrangement of a wireless network according to the first embodiment. An STA 101 is a WUR non-AP STA (wireless LAN terminal) in compliance with the IEEE802.11ba standard, and is, as will be described later, a communication apparatus that includes a PCR unit and a WUR unit according to the IEEE802.11ba standard. Here, IEEE is the abbreviation of Institute of Electrical and Electronics Engineers. Also, PCR is the abbreviation of Primary Connectivity Radio, and WUR is the abbreviation of Wake-Up Radio.

In addition, the STA 101 establishes a wireless connection with an AP 102 by using a PCR unit to execute association and authentication or the like in compliance with the IEEE802.11 series standard. The STA 101 can also execute data communication with the AP 102 by using the PCR unit to transmit/receive a frame in compliance with the IEEE802.11 series standard.

Furthermore, the STA 101 can maintain synchronization with the AP 102 by operating in a WUR mode in compliance with the IEEE802.11ba standard and using a WUR unit to receive a WUR beacon transmitted from the AP 102. The WUR mode is a mode in which the PCR unit is shifted to a doze state according to the IEEE802.11 series standard and the WUR unit is shifted to a communicable state. During the WUR mode, the STA 101 can set the PCR unit in the doze state to suppress the power consumption related to the communication with the AP 102. Note that the doze state is a power saving state that stops a function for transmitting/receiving signals to/from the AP 102 by using the PCR unit.

Note that when data to be transmitted to the AP 102 is generated, the STA 101 that is operating in the WUR mode can end the WUR mode and use the PCR unit to transmit data to the AP 102. Also, when the WUR unit of the STA 101 has received a WUR Wake-up frame in compliance with the IEEE802.11ba standard from the AP 102, the STA 101 can end the WUR mode and use the PCR unit to receive the data from the AP 102.

The AP 102 is a WUR AP (wireless LAN access point) in compliance with the IEEE802.11ba standard, and includes, in a similar manner, a PCR unit and a WUR according to the IEEE802.11ba standard. The PCR unit of the AP 102 constructs a wireless network in compliance with the IEEE802.11 series standard. In addition, a beacon transmitted by the PCR unit of the AP 102 is a PCR beacon in compliance with the IEEE802.11ba standard. The PCR beacon includes information indicating that the AP 102 is in compliance with IEEE802.11ba. The WUR unit of the AP 102 also transmits a WUR beacon in compliance with the IEEE802.11ba standard. The WUR beacon includes TSF information that is used to maintain synchronization with the AP 102 or is transmitted to each individual WUR non-AP STA or a plurality of non-AP STAs which have been grouped together. Note that TSF is the abbreviation of Timing Synchronization Function.

Note that the STA 101 may be, for example, an image input apparatus such as an image capturing apparatus (a camera, a video camera, or the like), a scanner, or the like or an image output apparatus such as a printer (an SFP or an MFP), a copying machine, a projector, or the like. It may also be a storage device such as a hard disk device or a memory device or an information processing apparatus such as a personal computer, a smartphone, or the like. Note that SFP is the abbreviation of Single Function Printer, and MFP is the abbreviation of Multi-Function Printer. It may also be an IoT (Internet of Things) device such as a sensor that can connect to the Internet via the AP 102.

(Arrangement of STA)

The arrangement of the STA 101 will be described with reference to FIGS. 2A and 2B. FIG. 2A is a block diagram showing an example of the hardware arrangement of the STA 101, and FIG. 2B is a block diagram showing an example of the functional arrangement of the STA 101. The hardware arrangement of the STA 101 will be described first. In FIG. 2A, a storage unit 201 is formed by one or more memories such as a ROM, a RAM, and the like, and stores programs for executing various kinds of operations (to be described later) and various kinds of information such as communication parameters for wireless communication and the like. Note that other than a memory such as a ROM, a RAM, or the like, a storage medium such as a flexible disk, a hard disk, an optical disk, a magneto-optical disk, a CD-ROM, a CD-R, a magnetic tape, a nonvolatile memory card, a DVD, or the like can be used as the storage unit 201.

A control unit 202 is formed by one or more processors such as a CPU, an MPU, and the like, and controls the entire STA 101 by executing programs stored in the storage unit 201. Note that the control unit 202 may control the entire STA 101 by the cooperation of an OS (Operating System) and programs stored in the storage unit 201. The control unit 202 may also include a plurality of processors such as a multicore processor or the like, and control the entire STA 101 by the plurality of processors.

In addition, the control unit 202 controls a function unit 203 to execute predetermined processing as image capturing, printing, projection, or the like. The function unit 203 is hardware for the STA 101 to execute the predetermined processing. For example, in a case in which the STA 101 is a camera, the function unit 203 may be an image capturing unit and perform image capturing processing. Alternatively, in a case in which the STA 101 is a printer, the function unit 203 may be a printing unit and perform print processing. Alternatively, in a case in which the STA 101 is a projector, the function unit 203 may be a projection unit and perform projection processing. The data to be processed by the function unit 203 may be data stored in the storage unit 201 or data obtained by communicating with another communication apparatus via a communication unit 206 (to be described later).

An input unit 204 accepts various kinds of operations performed by a user. An output unit 205 performs various kinds of outputs to the user. Here, an output by the output unit 205 includes at least one of display on a screen, an audio output by loudspeaker, an output by vibration, and the like. Note that both the input unit 204 and the output unit 205 may be implemented by a single module such as a touch panel. The communication unit 206 controls an antenna 207 to transmit/receive wireless signals for wireless communication. Note that the number of antennas 207 is not limited to one, and there may be a plurality of antennas.

Furthermore, the communication unit 206 includes a PCR unit 208 and a WUR unit 209. The PCR unit 208 has a PCR function, and performs wireless communication control in compliance with the IEEE802.11 series standard. The WUR unit 209 has a WUR function, and periodically waits to receive a signal such as a WUR beacon, a WUR Wake-up frame, or the like when the WUR mode is started. The WUR unit 209 has a function for notifying, when the WUR Wake-up frame has been received, the PCR unit 208 of the reception of the WUR Wake-up frame and ending the WUR mode. During the period of the WUR mode, the PCR unit 208 stops the function for transmitting/receiving signals for the sake of power saving. Hence, the function of the communication unit 206 will be wholly performed by the WUR unit 209.

Note that each of the PCR unit 208 and the WUR unit 209 is formed as an independent RF circuit. However, the present invention is not limited to this, and the PCR unit 208 and the WUR unit 209 may also be formed as an integrated RF circuit. In such a case, if the PCR is to beset to an awake state, the STA 101 will enable the function of the PCR unit 208. On the other hand, if the PCR is to be set in a doze state, the function of the PCR unit 208 will be disabled. The STA 101 also controls the WUR in a similar manner. An RF circuit in which the PCR unit 208 and the WUR unit 209 have been integrated operates in a state in which power can be saved more when the function of the WUR unit 209 has been enabled than when the function of the PCR unit 208 has been enabled. Note that, a case in which the PCR unit 208 is set in the awake state in this embodiment corresponds to a state in which the PCR function has been enabled in an RF circuit in which the PCR and the WUR have been integrated. Also, a case in which the WUR unit 209 is set in the awake state in this embodiment corresponds to a state in which the WUR function has been enabled in an RF circuit in which the PCR and the WUR have been integrated.

The functional arrangement of the STA 101 will be described next. In FIG. 2B, a transmission rate setting unit 211 determines and sets the transmission rate to be used when the PCR unit 208 of the STA 101 is to transmit a data frame. An RSSI obtainment unit 212 performs measurement processing or the like to obtain the RSSI of a signal received by the communication unit 206. A WUR mode control unit 213 performs control, in accordance with the change in the WUR mode, to shift the state of the PCR unit 208 to a doze state or an awake state in compliance with the IEEE802.11 series standard. A voltage measurement unit 214 measures the voltage of a power supply (not shown) of the STA 101 and calculates the average value and the variance value of the voltage. Note that the voltage measurement unit 214 is associated with processing to be described later in the third embodiment.

(Procedure of Processing)

Processing according to this embodiment which is performed when the STA 101 has established a wireless connection with the AP 102 which is in compliance with IEEE802.11ba will be described next. FIG. 3 is a flowchart showing the processing of the STA 101 according to this embodiment. Note that when a wireless connection is to be established with the AP 102, it will be assumed that the STA 101 has received a PCR beacon which is periodically transmitted from the AP 102. Here, the PCR beacon transmitted from the AP 102 includes information indicating that the AP 102 is in compliance with IEEE802.11ba. Hence, by receiving a PCR beacon, the STA 101 can determine that the AP 102, with which the wireless connection has been established, is in compliance with IEEE802.11ba. The processing of the flowchart shown in FIG. 3 is implemented by the control unit 202 reading out and executing a program stored in the storage unit 201 of the STA 101. In addition, some or all of the processes of the steps shown in the flowchart of FIG. 3 may be implemented by, for example, hardware such as an ASIC or the like. Here, ASIC is the abbreviation of Application Specific Integrated Circuit.

The transmission rate setting unit 211 of the STA 101 stores, in the storage unit 201, the latest value (the transmission rate before (for example, immediately before) the start of the WUR mode) of the transmission rate used to transmit a frame by the PCR unit 208 in the awake state (step S301). Note that the transmission rate according to this embodiment can be determined by MCS (Modulation and Coding Scheme (a scheme indexing the combinations of the modulation scheme and the coding rate)) of the data frame transmission. Also, in a case in which the PCR unit 208 is configured to execute MIMO (Multi-Input Multi-Output) communication with the AP 102, the transmission rate can also be determined by the number of spatial streams or the number of antennas. Hence, the transmission rate can also be represented by the number of spatial streams or the like of MIMO or MCS.

Next, when the WUR mode control unit 213 determines to shift the STA 101 into the WUR mode, the STA 101 executes processing to shift to the WUR mode with the AP 102 (step S302). For example, upon accepting an operation by the user or based on the fact that the STA 101 has not transmitted data for a predetermined time, the WUR mode control unit 213 determines to shift the STA 101 to the WUR mode. More specifically, as the processing executed to shift the STA to the WUR mode, the PCR unit 208 of the STA 101 transmits an Enter WUR Mode Request frame, which is a request to start the WUR mode, to the AP 102. The Enter WUR Mode Request frame includes the cycle information (duty cycle period) that indicates the cycle (reception interval) of the period in which the WUR unit 209 waits to receive a signal from the WUR of the AP 102. The AP 102 determines, as the transmission cycle (WUR duty cycle) of the WUR beacon, the reception interval included in the Enter WUR Mode Request frame received from the STA 101. Subsequently, the AP 102 transmits an Enter WUR Mode Response frame which includes the start timing information ("Starting Time Of The WUR Duty Cycle") indicating the start timing of the transmission interval.

The PCR unit 208 of the STA 101 receives the Enter WUR Mode Response frame from the AP 102, and transmits a WUR Mode Enter frame to the AP 102 if it agrees with the contents of the Enter WUR Mode Response frame, that is, the start timing information. Subsequently, the WUR mode control unit 213 causes, as a timing based on the start timing information, the WUR unit 209 to start waiting to receive a signal. Furthermore, the WUR mode control unit 213 causes the PCR unit 208 to shift to the doze state (step S302). The STA 101 shifts to the WUR mode in this manner. Note that each of the Enter WUR Mode Request frame and the Enter WUR Mode Response frame is an action frame in compliance with the IEEE802.11 series standard.

Upon shifting to the WUR mode, the WUR unit 209 of the STA 101 receives the WUR beacon which is periodically transmitted by the AP 102, and the RSSI obtainment unit 212 obtains the RSSI of the beacon. The timing at which the WUR beacon is received is determined based on the cycle (reception interval) of the period in which the WUR unit 209 waits to receive a signal from the WUR unit of the AP 102 and the start timing information included in the Enter WUR Mode Response frame. The RSSI obtainment unit 212 further determines, based on the obtained RSSI, whether the WUR unit 209 can successfully receive a WUR frame. Note that the fact that the WUR unit 209 can successfully receive a WUR frame represents that the WUR unit 209 can successfully execute reception processing which includes decoding processing for obtaining a decoded signal. For example, the RSSI obtainment unit 212 determines that the reception will be successful in a case in which the value of the RSSI is equal to or more than a predetermined reception threshold, and determines that the reception will fail in a case in which the value of the RSSI is less than the predetermined reception threshold. This reception threshold can be set to be, for example, a minimum reception sensitivity (for example, the received signal strength indicator by which the WUR unit 209 can decode a signal of a minimum transmission rate) of the WUR unit 209.

When the RSSI obtainment unit has determined that the reception of a WUR beacon has been successful, the WUR mode control unit 213 determines whether to end the WUR mode (step S303). The WUR mode control unit 213 executes the determination based on, for example, whether the data to be transmitted from the STA 101 to the AP 102 is present. In this case, the WUR mode control unit 213 determines to end the WUR mode without continuing the WUR mode if data to be transmitted is present, and determines to continue the WUR mode if data to be transmitted is not present. In addition, the WUR mode control unit 213 can also determine to end the WUR mode if the WUR unit 209 has received, following the WUR beacon, a WUR Wake-up frame addressed to the STA 101 (addressed to the self-apparatus) from the AP 102.

The WUR mode control unit 213 may also determine to end the WUR mode if the WUR unit 209 has not once successfully received a WUR beacon transmitted from the AP 102 over a predetermined period. The WUR mode control unit 213 may also determine to end the WUR mode if the WUR unit 209 has repeatedly attempted to receive a WUR beacon a predetermined upper limit number of times over a predetermined period, but has not once successfully received the WUR beacon. Here, the predetermined upper limit number of times can be a numerical value that can be arbitrarily set in accordance with the degree to which a communication failure that can randomly occur will be considered, and can be set to a plurality of times of two or more. For example, if this predetermined upper limit number of times is set to once, the WUR mode will be ended even when the communication state has momentarily degraded such as in a case in which something has crossed the communication path or the like. If this predetermined upper limit number of times is set to a plurality of times, the WUR mode will be ended after a wait for the state to stabilize. That is, there is a trade-off between responsiveness and power consumption. Hence, for example, it may be arranged so the user will select whether to prioritize responsiveness or power consumption, and the upper limit number of times may be set smaller in a case in which the user selects to prioritize responsiveness than in a case in which the user selects to prioritize power consumption. Alternatively, it may be arranged so that a predetermined number of times will be directly input by the user. Furthermore, it may be set so that the upper limit number of times may be set smaller in a case in which a high amount of battery charge is remaining in the STA 101 than in a case in which a low amount of battery charge is remaining in the STA. Alternatively, the upper limit number of times may be a fixed value set in advance in the STA 101.

If the WUR mode is to be ended (YES in step S303) as a result of the determination of step S303, the transmission rate setting unit 211 sets the transmission rate stored in the storage unit 201 as the transmission rate to be used by the PCR unit 208 after the end of the WUR mode (immediately after the end of the WUR mode) (step S304). Next, the WUR mode control unit 213 ends the WUR mode and causes the PCR unit 208 to shift from the doze state to the awake state (step S305). Causing the PCR unit 208 to shift to the awake state is also referred to as activation. Subsequently, the STA 101 restarts communicating with the AP 102 via the PCR unit 208. On the other hand, as a result of step S303, if the WUR mode is to be continued (NO in step S303), the WUR unit 209 continues the WUR mode and wait to receive the WUR beacon from the AP 102.

According to this embodiment, after the PCR unit has been activated after the end of the WUR mode, the PCR unit can execute communication at an appropriate transmission rate.

Second Embodiment

The second embodiment will describe a method of changing the transmission rate in a case in which a WUR unit 209 cannot receive a WUR beacon that is periodically transmitted from an AP 102 after an STA 101 has shifted to a WUR mode. Note that in a manner similar to the first embodiment, the arrangement of the STA 101 is the arrangement shown in FIGS. 2A and 2B. Points different from the first embodiment will be described hereinafter.

(Procedure of Processing)

Processing performed in a case in which the STA 101 according to this embodiment has established a wireless connection with the AP 102 in compliance with IEEE802.11ba will be described. FIG. 4 is a flowchart showing the processing of the STA 101 according to this embodiment. The processing of the flowchart shown in FIG. 4 is implemented by a control unit 202 reading out and executing a program stored in a storage unit 201 of the STA 101. In addition, some or all of the processes of the steps shown in the flowchart of FIG. 4 may be implemented by, for example, hardware such as an ASIC or the like.

The processes of steps S401 and S402 are similar to the processes of steps S301 and S302 of FIG. 3. In step S403, the WUR unit 209 attempts to receive a WUR beacon over a predetermined period. Whether the reception of the WUR beacon has succeeded or failed is determined based on, in a manner similar to the first embodiment, whether the RSSI of the received WUR beacon is equal to or more than a predetermined reception threshold or is less than the predetermined reception threshold. If it is determined that the WUR unit 209 has not once successfully received the WUR beacon transmitted from the AP 102 over the predetermined period (NO in step S403), the WUR mode control unit 213 determines not to continue the WUR mode. If it is determined that the WUR unit 209 has successfully received the WUR beacon in the predetermined period (YES in step S403), the WUR mode control unit 213 determines, in a manner similar to the process of step S303 in FIG. 3, whether to end the WUR mode (step S404). If the WUR mode is to be ended (YES in step S404), processes similar to those of steps S304 and S305 in FIG. 3 are executed. That is, a transmission rate setting unit 211 sets (step S405) a transmission rate stored in the storage unit 201 as the transmission rate to be used by a PCR unit 208 after the end of the WUR mode, and the WUR mode control unit 213 ends the WUR mode and activate the PCR unit 208 (step S406). If the WUR mode is not to be ended (NO in step S404), the process returns again to step S403.

On the other hand, if the WUR unit 209 has not successfully received the WUR beacon in the predetermined period (NO in step S403), it can be assumed that the communication is difficult because the signal from the AP 102 is weak. Hence, the transmission rate setting unit 211 updates (update and store) the transmission rate stored in the storage unit 201 in step S401 into a transmission rate (low transmission rate) lower than the stored transmission rate (step S407). The low transmission rate can be an arbitrary low transmission rate such as the minimum transmission rate that can be used by the STA 101 or the like. In addition, the low transmission rate may be set in advance in the STA 101 or may be a transmission rate calculated by reducing the transmission rate, stored in step S401, by a predetermined amount.

Next, a WUR mode control unit 213 ends the WUR mode (step S408), and the transmission rate setting unit 211 sets the transmission rate (low transmission rate) updated in the storage unit 201 as the transmission rate of the PCR unit 208 (step S409). Subsequently, the WUR mode control unit 213 causes the PCR unit 208 to shift to the awake state (step S410).

Note that even in a case in which the WUR unit 209 has successfully received the WUR beacon in the predetermined period (YES in step S403), the transmission rate setting unit 211 can set, in step S405, a low transmission rate as stored in step S407, if the reception has succeeded for the first time after a plurality of attempts. Since it can be assumed that the communication environment is unfavorable, such as a state in which the intensity of reception radio waves is low or the like, by the fact that reception has been attempted for a plurality of times, it will be possible to more reliably ensure the communication connection by reducing the transmission rate.

In this manner, according to this embodiment, after the PCR unit has been activated after the end of the WUR mode, the PCR unit can execute communication at an appropriate transmission rate in accordance with whether the WUR beacon has been successfully received.

Third Embodiment

The third embodiment will describe a method in which the transmission rate is reduced when modulation signal degradation has occurred in an STA 101 due to unstable power supply. Note that in a manner similar to the first embodiment, the arrangement of the STA 101 is the arrangement shown in FIGS. 2A and 2B. Points different from the first embodiment will be described hereinafter.

(Procedure of Processing)

Figure 5A:
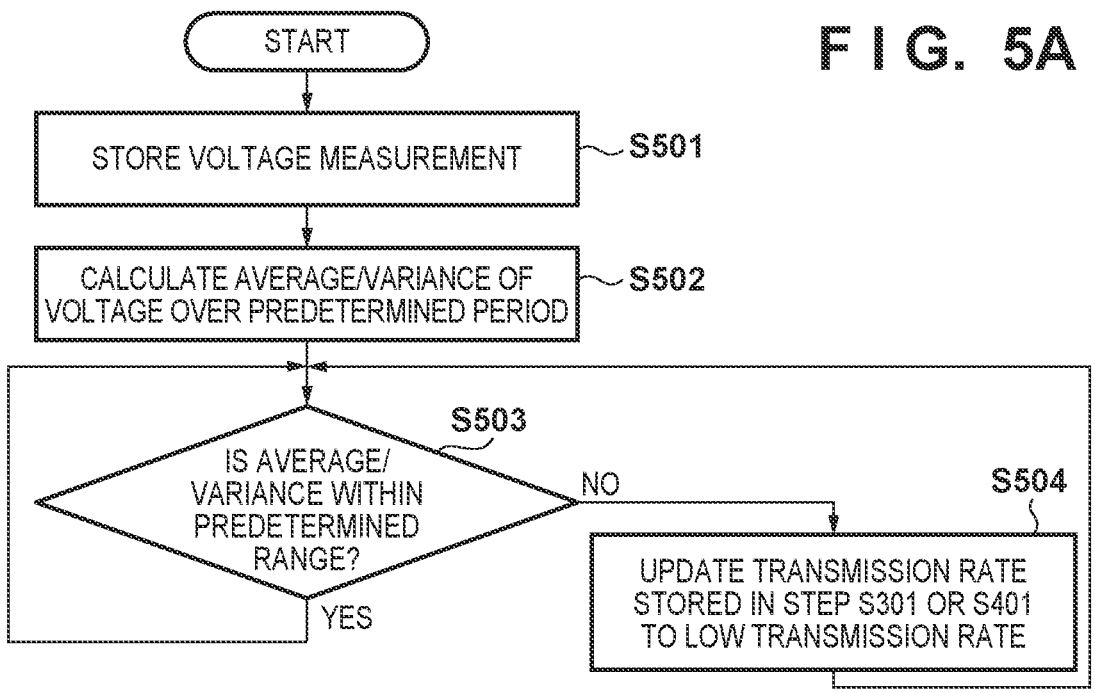
FIG. 5A is a flowchart showing the processing of an STA according to the third embodiment.
Figure 5B:
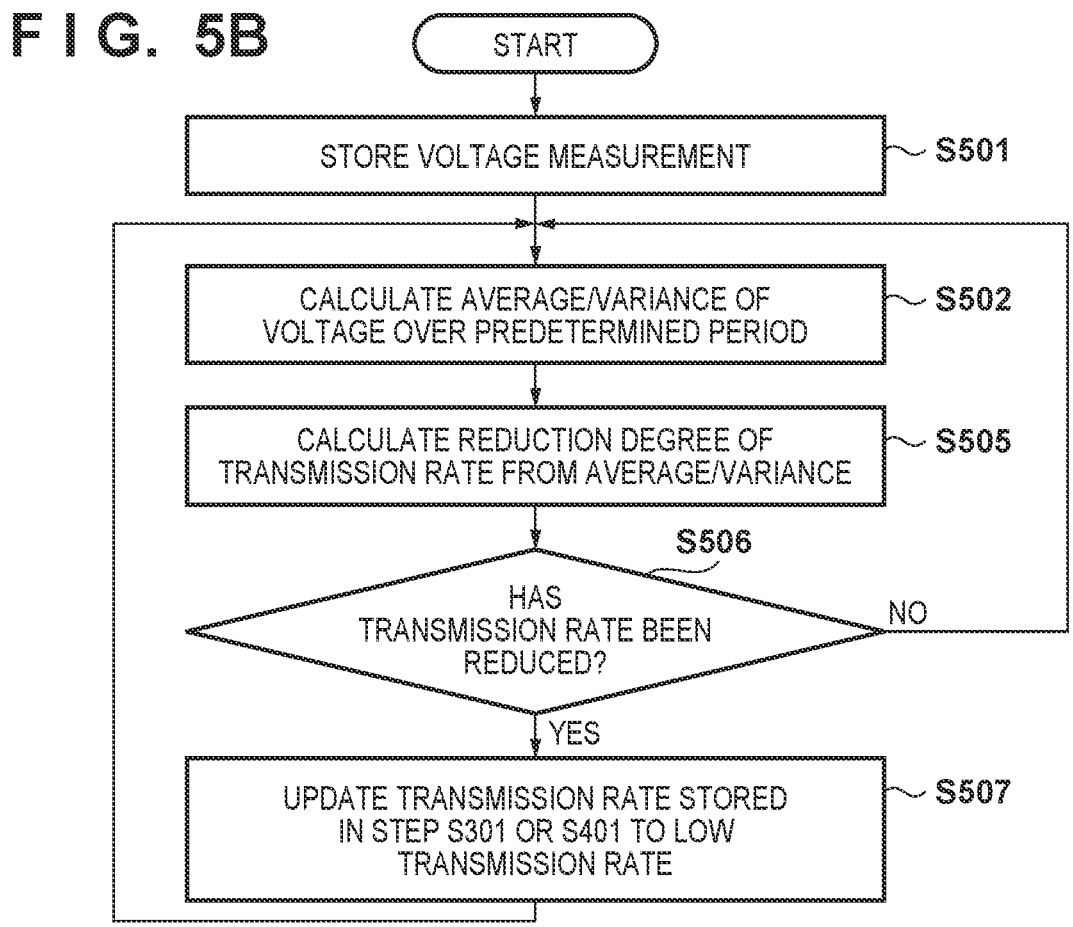
FIG. 5B is a flowchart showing the processing of the STA according to the third embodiment.

Processing of the STA 101 according to this embodiment will be described. FIGS. 5A and 5B are flowcharts showing the processing of the STA 101 according to this embodiment. The processing of the flowcharts shown in FIGS. 5A and 5B is implemented by a control unit 202 reading out and executing a program stored in a storage unit 201 of the STA 101. In addition, some or all of the processes of the steps shown in the flowcharts of FIGS. 5A and 5B may be implemented by, for example, hardware such as an ASIC or the like.

For example, in a case in which the STA 101 is operated by driving a battery, the voltage of the battery may sometimes degrade due to long term use. A voltage fluctuation may also occur in accordance with noise or the degradation of the stability of the voltage. If the gain and the phase characteristics of each electrical circuit fluctuate in such times, the fluctuation will be included in an IQ signal that is obtained by modulation. As a result, wireless communication will not be able to be performed at a high transmission rate. The STA 101 according to this embodiment can operate to set an appropriate transmission rate even in a case in which such a voltage fluctuation has occurred. Note that the processing shown in FIGS. 5A and 5B will be performed before (before YES in step S303 of FIG. 3, before YES in step S404 of FIG. 4, or before step S408) the WUR mode control unit 213 is to end the WUR mode.

In FIG. 5A, first, a voltage measurement unit 214 measures the power supply voltage for a predetermined period (step S501), and calculates an average value and a variance value of the voltage values over the predetermined time (step S502). Next, the voltage measurement unit 214 determines whether the average value and the variance value that have been calculated fall within a predetermined average range and a predetermined variance range, respectively, defined in advance. If the average value and the variance value that have been calculated do not fall within a predetermined average range and a predetermined variance range, respectively (NO in step S503), a transmission rate setting unit 211 updates the transmission rate, stored in the storage unit 201 in step S301 or step S401, by setting a low transmission rate (step S504). The low transmission rate may be determined and preset in the STA 101 based on the hardware characteristics of the STA 101 and a result of apparatus evaluation which has been performed in advance. Alternatively, the minimum transmission rate that can be used by the STA 101 may be set as the low transmission rate or a transmission rate calculated by reducing the transmission rate stored in the storage unit 201 by a predetermined amount may be set as the low transmission rate.

FIG. 5B shows another example of processing performed after the voltage measurement unit 214 has calculated the average value and the variance value of the voltage values over a predetermined period. In FIG. 5B, the processes of steps S501 and S502 are similar to those of FIG. 5A, and the voltage measurement unit 214 calculates, in step S505, the degree of reduction of the transmission rate based on the calculated average value/variance value (step S505). For example, the voltage measurement unit 214 calculates the degree to which the transmission rate stored in the storage unit 201 will be reduced in accordance with the degree of deviation of the calculated average value from an expected value or the magnitude of the calculated variance value. If it is determined that the transmission rate is to be reduced (YES in step S506) as result of the calculation in step S505, the transmission rate stored in the storage unit 201 will be updated (step S507). The update processing of the transmission rate in step S507 is similar to that of step S504.

In this manner, according to this embodiment, even in a case in which a voltage fluctuation has occurred, the PCR unit can perform communication at an appropriate transmission rate after the PCR unit has been activated after the end of the WUR mode.

Although the above-described embodiments have described that the transmission rate is determined based on the number of spatial streams or the number of antennas of MIMO or MCS, the transmission rate can also be determined based on the number of frames to be aggregated by frame aggregation or the number of channels to be bundled when channel bonding is used.

According to the present invention, the setting related to data transmission to be performed after the end of the WUR mode can be determined appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   at least one processor; and
   at least one memory that stores a set of instructions for causing, when executed by the at least one processor, the communication apparatus to perform operations including:
     receiving a Wake Up Radio (WUR) frame defined in an Institute of Electrical and Electronics Engineers (IEEE) 802.11 standard series;
     transmitting a frame different from the WUR frame, wherein the frame is a frame having a predetermined type compliant with the IEEE802.11 standard series;
     storing, in a storage area, a first transmission rate used for transmitting, to an access point, a frame having the predetermined type;
     changing an operation mode for operating the communication apparatus related to communication of the communication apparatus to a WUR mode, in which the communication apparatus waits for the WUR frame without waiting a frame having the predetermined type, in a case where a predetermined condition is satisfied; and
     transmitting, after ending the operation mode for operating the communication apparatus in the WUR mode, a frame having the predetermined type by using the first transmission rate stored in the storage area.

2. The communication apparatus according to claim 1, wherein the operations further include:
   determining whether the communication apparatus can successfully receive a signal related to the WUR mode transmitted from the access point during the WUR mode, and
   ending the operation mode for operating the communication apparatus in the WUR mode, in a case where the communication apparatus operates in the WUR mode and it is determined that the communication apparatus has not successfully received the signal related to the WUR mode over a predetermined period.

3. The communication apparatus according to claim 2, wherein, in the determining, in a case in which a received signal strength indicator of the signal related to the WUR mode is less than a reception threshold over the predetermined period, it is determined that the signal related to the WUR mode could not be successfully received.

4. The communication apparatus according to claim 3, wherein the operations further include updating the first transmission rate stored in the storage area by a transmission rate lower than the stored first transmission rate, in a case in which the received signal strength indicator of the signal related to the WUR mode is less than the reception threshold over the predetermined period during the WUR mode.

5. The communication apparatus according to claim 2, wherein the operations further include ending the operation mode for operating the communication apparatus in the WUR mode, in a case where the communication apparatus operates in the WUR mode and the communication apparatus receives a predetermined signal indicating that the WUR mode is to be ended from the access point during the WUR mode.

6. The communication apparatus according to claim 2, wherein the operations further include ending the operation mode for operating the communication apparatus in the WUR mode, in a case in which data to be transmitted by the communication apparatus is present during the WUR mode.

7. The communication apparatus according to claim 1, wherein the operations further include:
   measuring a power supply voltage of the communication apparatus for a predetermined period;
   calculating an average value and a variance value of the voltage based on the measured power supply voltage; and
   wherein updating the first transmission rate stored in the storage area by a transmission rate lower than the first transmission rate in a case in which the average value and the variance value do not fall within a first range and a second range, respectively.

8. The communication apparatus according to claim 7, wherein the first transmission rate to be updated in a case in which the average value and the variance value do not fall within the first range and the second range, respectively, is determined based on the average value and the variance value of the voltage.

9. The communication apparatus according to claim 1, wherein the first transmission rate is determined based on at least a modulation scheme and a coding rate used for communicating a frame having the predetermined type.

10. The communication apparatus according to claim 2, wherein the signal related to the WUR mode is a WUR beacon frame and the WUR frame includes at least the WUR beacon frame.

11. A method of controlling a communication apparatus, comprising:
   receiving a Wake Up Radio (WUR) frame defined in an Institute of Electrical and Electronics Engineers (IEEE) 802.11 standard series;
   transmitting a frame different from the WUR frame, wherein the frame is a frame having a predetermined type compliant with the IEEE802.11 standard series;

storing, in a storage area, a first transmission rate used for transmitting, to an access point, a frame having the predetermined type;

changing an operation mode related to communication of the communication apparatus to a WUR mode, in which the communication apparatus waits for WUR frame without waiting a frame having the predetermined type, in a case where a predetermined condition is satisfied; and transmitting, after ending the operation mode for operating the communication apparatus in the WUR mode, a frame having the predetermined type by using the first transmission rate stored in the storage area.

12. A non-transitory computer-readable storage medium storing a computer program for causing a computer to execute a method of controlling a communication apparatus, the method comprising:

receiving a Wake Up Radio (WUR) frame defined in an Institute of Electrical and Electronics Engineers (IEEE) 802.11 standard series;

transmitting a frame different from the WUR frame, wherein the frame is a frame having a predetermined type compliant with the IEEE802.11 standard series;

storing, in a storage area, a first transmission rate used for transmitting, to an access point, a frame having the predetermined type;

changing an operation mode related to communication of the communication apparatus to a WUR mode, in which the communication apparatus waits for WUR frame without waiting a frame having the predetermined type, in a case where a predetermined condition is satisfied; and transmitting, after ending the operation mode for operating the communication apparatus in the WUR mode, a frame having the predetermined type by using the first transmission rate stored in the storage area.

13. The communication apparatus according to claim 2, wherein the WUR frame is a frame compliant with the IEEE802.11ba standard.

* * * * *